(12) United States Patent
Davis (10) Patent No.: US 9,131,058 B2
(45) Date of Patent: Sep. 8, 2015

(54) CONFERENCE SERVER COMMUNICATION TECHNIQUES

(75) Inventor: Jay Davis, Hillsdale, NJ (US)

(73) Assignee: Vidyo, Inc., Hackensack, NJ (US)

( * ) Notice: Subject to any disclaimer, the term of this patent is extended or adjusted under 35 U.S.C. 154(b) by 244 days.

(21) Appl. No.: 13/586,575

(22) Filed: Aug. 15, 2012

(65) Prior Publication Data

US 2014/0049594 A1    Feb. 20, 2014

(51) Int. Cl.
*H04N 7/15*     (2006.01)
*H04M 3/56*     (2006.01)
*H04L 29/06*    (2006.01)
*H04L 12/18*    (2006.01)

(52) U.S. Cl.
CPC ........... *H04M 3/567* (2013.01); *H04L 65/1093* (2013.01); *H04L 65/403* (2013.01); *H04L 12/1813* (2013.01); *H04N 7/152* (2013.01)

(58) Field of Classification Search
USPC .......... 348/14.01–14.16; 370/352; 379/93.01, 379/93.21, 202.01
See application file for complete search history.

(56) References Cited

U.S. PATENT DOCUMENTS

| | | | |
|---|---|---|---|
| 2006/0256188 A1* | 11/2006 | Mock et al. | 348/14.09 |
| 2007/0009114 A1* | 1/2007 | Kenoyer et al. | 381/122 |
| 2007/0211703 A1* | 9/2007 | Gu et al. | 370/356 |
| 2012/0082066 A1* | 4/2012 | O'Sullivan et al. | 370/260 |
| 2012/0170725 A1* | 7/2012 | Ramanathan et al. | 379/93.01 |
| 2012/0281060 A1* | 11/2012 | Swanson et al. | 348/14.08 |
| 2012/0321060 A1* | 12/2012 | Lucey et al. | 379/93.21 |
| 2013/0135427 A1* | 5/2013 | Wu et al. | 348/14.09 |

* cited by examiner

*Primary Examiner* — Joseph J Nguyen
(74) *Attorney, Agent, or Firm* — Baker Botts, LLP (57) ABSTRACT

A method for updating at least one data element in a conference is disclosed. The conference can include a first node having at least a first server but no endpoints; a second node coupled to the first node, the second node having at least a second server but no endpoints; a first endpoint coupled to the first server; and a second endpoint coupled to the second server. The first and second nodes can form a free tree topology. In such a conference, an exemplary method includes sending an initial update from either (a) the first server belonging to the first node, or (b) the first endpoint, to the second server belonging to the second node; receiving the initial update by the second server; and sending, by the second server, the content of the initial update as an update to at least one of a third server or the second endpoint.

12 Claims, 5 Drawing Sheets

```
typedef struct {
    /* These items never change after object construction */
402   String    altId;            /* ID the endpoint uses to identify itself to the Router instead of its endpoint ID */
403   String    participantUri;   /* Participant URI of the endpoint */
404   String    focusId;          /* Focus ID of server which provided information about this camera */
405   String    meshId;           /* Mesh ID of server which provided information about this camera */
406   String    cameraId;         /* ID of camera (unique among all cameras from a specific endpoint) */

/* These items may be changed by updates */
408   String    cameraName;       /* Display name of the camera */
409   String    cameraType;       /* Type of camera */
410   String    controlType;      /* Space separated list of control message types supported */
411   String    cameraSource;     /* Source stream attribute to identify this camera */
412   String    status;           /* Status of camera (i.e. Ready, Privacy, Locked, Error) */
} ConfDataCamera;
```

Figure 5

CONFERENCE SERVER COMMUNICATION TECHNIQUES

FIELD

The disclosed subject matter relates to multimedia communication techniques where a multimedia conference involves a plurality of conference servers and endpoints.

BACKGROUND

In the recent decades, Internet Protocol (IP-) based networks, such as private IP networks or the Internet, have become a viable base technology for voice and multimedia communication. While IP and its supporting protocols such as User Datagram Protocol (UDP), Transmission Control Protocol (TCP) and other protocols can, from a protocol technology viewpoint, allow for multipoint conferences not involving any centralized servers, most network topologies not involving servers have so many disadvantages that in practice, most multipoint conferences over IP involve a single centralized conference server. The purpose of the server can be to mix audio and (in case of multimedia conferences) video signals, enable conference control, admission control, keep state information of the conference, and many more services. In many cases, endpoints (virtually) connect to the server using IP technologies over IP networks or the Internet, and the server acts as the hub in a star topology network—that is, all endpoints maintain a direct connection with the server.

Conference servers can have many purposes. For example, they can

- manipulate media streams (i.e. mixing of audio streams, tiling of video streams, switching of audio and/or video streams),
- share between servers and endpoints real-time media plane conference state information, (such as, for example, Real-time Transport Control Protocol (RTCP) receiver reports), and.
- share such control information required for the establishment and manipulation of media channels.

Operations on application level data between multiple servers and clients has not received a comparable amount of attention as compared to the above uses of conference servers. In order to support such application level operations, conference servers and endpoints may be required to share application level state information, which can be in the form of a shared database. One standardized application protocol suite for application level data sharing and manipulation, ITU-T Rec. T.120 (ITU-T Rec. T.120 "Data protocols for multimedia conferencing", 2007-1-13, available from http://www.itu.int/ITU-T/recommendations/index.aspx), and its companion recommendations referenced therein, allows for sharing of such state among servers and endpoints. However, the protocols used by H.120 rely on a virtual rooted tree network topology, wherein one dedicated server, located at the root of the tree and known as "controller" controls and maintains the state of the conference. Note that a rooted tree topology is a subclass of the general tree topology. In all tree topologies, there is one path between any two nodes, e.g. there are no circular connection structures. A rooted tree topology can have the further restriction that there is exactly one distinguished node of the tree, the root. In contrast, a general tree topology, also known as free tree, may lack that distinguished node.

The presence of a single dedicated server located at the root of the tree, which acts as a controller can create a single point of failure, which may have consequences for the reliability of a conference in case that server, and/or the physical and virtual connections to it, are not fully reliable. Further, if that server were intentionally leaving the conference, a new server would be dedicated as controller, and the virtual conference topology would have to be adjusted accordingly, which can be difficult to implement in a seamless way.

Another option for distributing state information between the servers and endpoints of a conference can be the media plane, specifically the Real-Time Control Protocol (RTCP, RFC 3550, available from www.ietf.org). While RTCP can be used to maintain a state among multiple conference servers and endpoints, the information of RTCP flows on the "media plane", and can be sent over the Unified Datagram Protocol (UDP) and potentially over Internet Protocol (IP) Multicast, each of which may have reliability issues that can require an additional protocol overhead to ensure reliable transmission of state updates between servers and clients.

Accordingly, there exists a need for a mechanism that allows for an efficient sharing of such application level data between multiple servers and endpoints which allows for easy reconfiguration of a conference (including dropping any server).

SUMMARY

The disclosed subject matter provides techniques for maintaining a state between servers and endpoints arranged in a non-tree topology virtual network that involves at least one node.

In certain embodiments, the disclosed subject matter provides techniques for updating at least one data element in a conference which does not have a dedicated server acting as a controller, where the conference has a first node including a first server but no endpoints and a second node including a second server but no endpoints. The techniques can include sending an initial update from either (a) the first server belonging to the first node, or (b) the first endpoint, to the second server belonging to the second node; receiving the initial update by the second server, and sending, by the second server, the content of the initial update as an update to at least one of a third server or the second endpoint.

In certain arrangements, the first and second nodes and first and second endpoints are coupled together in a free tree topology. At least one of the initial update or the update can be sent over a signaling plane.

In certain arrangements, the protocol hierarchy used to send the at least one of the initial update or the update include a Conference Management Control Protocol. The data elements can include a camera control data element.

The first endpoint can be a newly connected endpoint, and the sending of an initial update can be a consequence of the newly connected endpoint connecting to the conference. The initial update can be an incremental update, and can include information related to the newly connected endpoint.

In certain arrangements, the first server is the server of an endpoint that has recently disconnected, and the initial update is a consequence of the recent disconnecting of the endpoint. The update can be an incremental update that includes information related to the recently disconnected endpoint.

In certain arrangements, the first server sends an update to the second endpoint, as a result of the second endpoint having recently connected to the first server. The update can be a full update, and the first server can send an update to the second server as a result of the second server having recently connected to the first server.

BRIEF DESCRIPTION OF THE DRAWINGS

Further features, the nature, and various advantages of the disclosed subject matter will be more apparent from the following detailed description and the accompanying drawings in which.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

The disclosed subject matter can be applicable to provide the functionality of a shared database between endpoints and servers in a (multipoint) conference using a free tree topology as described below. The functionality can be delivered through a protocol design that minimizes traffic, delay, and allows for reliable shared database updates.

Figure 1:
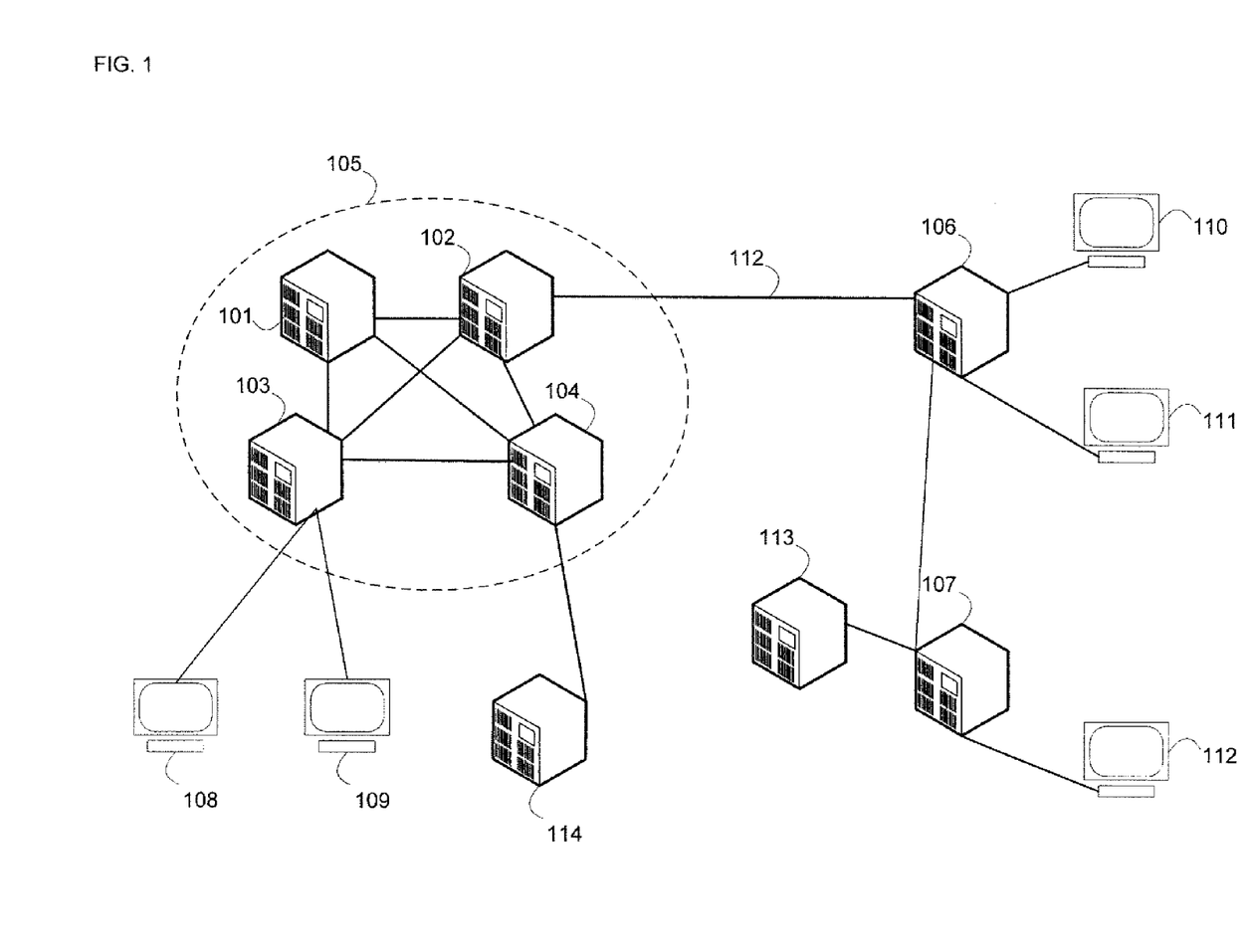
FIG. 1 shows a network topology in accordance with the disclosed subject matter.

In one embodiment, the disclosed subject matter can be used in a conference network topology as outlined in FIG. 1. Two classes of functional entities can be involved in a conference: server(s); and endpoint(s) (also known as client(s)). There can be restrictions as to how the servers are connected to each other. It should be noted that no dedicated server acting as a controller may be required. A valid group of interconnected servers can be organized as a free tree, as described below:

A "node" can include one of more servers. If there is more than one server in a node, then the servers are, according to the same or another embodiment, connected to each other in a full mesh topology—that is, all servers are connected to every other server of the node. In mathematical terms, the servers within a node form a complete graph.

Nodes can be connected to each other via a single connection. That connection may terminate to any server within that node.

The nodes that form the entire conference can form a free tree topology (i.e., each node is connected to each other node by exactly one connection).

Endpoints or clients can be equivalent to a node consisting of a single server, except that they must connect to one and only one server. In other words, endpoints can be leafs of the tree topology. Treating endpoints as a special case in the way describe above is not required for the operation of the disclosed subject matter, but allows for more efficient operation.

All servers in a node can contain the same information, and the connection of the node to other nodes can terminate at any server of the node, thus the handover of a connection from one server to another inside the node, if required for example if the server goes down, is not difficult. No reconfiguration of the conference topology may be required beyond changing the route of the connection.

FIG. 1 shows an exemplary conference topology fulfilling the design constraints mentioned above. Four servers (101), (102), (103), and (104) form a node (105). All four servers have direct interconnection with all other servers of the node (105). Servers (106) and (107) each form nodes of their own. Endpoints (108) and (109) are connected to server (103) and thereby to node (105). Endpoints (110) and (111) are connected to server (106). Communication between endpoint (110) or (111) and endpoint (108) involves two nodes: single server node (106) and multi-server node (105). Single server node (106) and node (105) are connected by a single node-to-node connection (112). Single server nodes (107) with connected endpoint (112); node (113); and node (114) are depicted to illustrate the free tree nature of the network topology: the free tree has no root.

While the focus above has been on the use of a free tree topology for the interconnection between nodes and endpoints, an alternative approach can be to allow for a network topology that allows for circular structures. In this case, it may be necessary to include loop detection protocol mechanisms so to avoid unnecessary network traffic and race conditions.

Over the connections, messages can be exchanged. Those messages can be coded in a binary representation, XML, ANS.1, or any other suitable data representation. The messages can be sent by an underlying protocol stack that can involve protocols such as, for example, IP, TCP, and a Conference Management Control Protocol as disclosed in, for example <add CMCP reference>.

One purpose of the disclosed subject matter can be to insure that all information made available by any server or client is propagated to, and saved on, substantially all clients and servers involved in the conference. The information can be structured into data elements. A data element can be updated (for example: added, changed, and removed) in a manner as described below. In most cases, to be useful, the data element should also be updated in a manner which insures that it is consistent across all clients and servers.

Some data elements may have an owner. One consequence of a data element having an owner can be that the data element logically exists only for as long as that owner is in the conference. An owner can be a client or a server. Data elements with an associated owner should be maintained properly as clients and servers join and leave the conference. For example, if a client or a server joins, a data element which has an owner may need to be created, populated with data reflecting the owner's choice, and distributed to other clients and servers. Further, if a client or server leaves a conference, a data element owned by the client or server may need to be removed from all other clients and server, which in turn can require that those other clients and servers be informed about the owning client or server is leaving the conference.

Other data elements may not have an owner. Such data elements can be created with the creation of a conference, and can be removed at the termination of a conference. Ownerless data elements can include information involving properties shared by all participants in the conference, for example the name of the conference, its creation time, and so forth. Data elements without an owner may not be updateable, or can be updated by a selected subset (i.e. all endpoints) or by all participants in the conference.

A cascaded conference can refer to a conference involving more than one server. In at least some cases, when a client wishes to join a non-cascaded conference, it cannot do so because there is no transmission path or other resource available (for example because of network topology issues, or because of commercial constraints) between itself and the server that serves the non-cascaded conference. For example, if a client physically resides on a different continent than a server, it can be advantageous to rely on an established server-to-server routing (that may involve guaranteed quality of service), rather than attempting to directly connect to the server using the non-guaranteed Internet for the cross-ocean segment.

In such a case, the client can form a conference with another server, and that server merge the conference consisting of itself and the client with the conference run by the server which originally ran the whole conference. The result can be a cascaded conference involving two servers, and the process of joining the two conferences in to one cascaded conference is known as a cascaded conference merge. Similarly, the process of removing at least one server of a cascaded conference is sometimes referred to as breaking that server out, or apart of, the cascaded conference. Cascaded conference merging or breaking apart can also require the transmission of data elements owned by a client or a server, as the merged or parted conference can include more or fewer owners. While a cascaded conference involving only two servers is described herein, a cascaded conference can include more than two servers and can include two or more nodes, each with one or more servers.

According to an embodiment, a server can maintain a specific view of the data element(s) for each server and client connected to it. Notifications of changes to the data element(s) can be handled based on these specific views. For example, a server receiving a change to the information about a camera would save that information in the data view associated with the entity that it received this change notification from, and send a notification of this change will be sent to all other entities directly connected to it. Similarly, implicit changes of data elements, or the generation or removal of data elements that can be caused by servers or clients dropping from the conference can also be handled in such a specific way. Servers within a node can be a special case in that information being received from any server in a full mesh does not need to be reported to other servers in that same node.

Data elements that have an owner can also be tracked with these same set of specific views to ensure this data element is maintained properly as clients and servers are added and removed, and as the conferences themselves are split apart of merged together.

In the following, details are provided on how data elements are stored and propagated between some or all of the servers and clients that constitute a conference. There can be two conceptual types of data element updates: full and incremental. A full update can contain substantially all current data elements of substantially all servers and clients. An incremental update can contain changes only to a subset of the data elements, where those specific data elements can be created, updated, or removed. Some data element can have an owner, which can result in the data element being created or removed by servers and clients in the event the owner joins or leaves the conference and/or at the time the servers and clients learn about the joining or leaving.

In some cases, a server can be involved in, and therefore maintain data for, multiple conferences. However, in such an event, according to the disclosed subject matter, each conference can have its own scope and can be handled independently, except for the already mentioned cases of merges of conferences.

A server can maintain information about the servers or clients it is sharing data elements with in order to properly propagate the data. One aspect of this information can be the nature of the entity data is shared with, for example whether it is a server or a client.

If the entity is a server, then an indication of whether or not this other server is part of the same node as this server can also maintained. A client can be viewed as a suitable alternative for a server that is not part of the same node, although certain operations can be done more efficiently if the fact that it is a client is known, which is what will be described herein. For example, since a client is a single entity, notifications received from a client do not have to be concerned with the additional logic for handling multi-server nodes that has to be followed when a notification is received from a server.

For data elements that have an owner, and thus should not exist once the owner of the information leaves the conference, the immediate source of the data can be stored with the data itself on each server. This "immediate source" can be the client or other server that actually reported the information to this server, which may or may not be the original source of the information.

Figure 2:
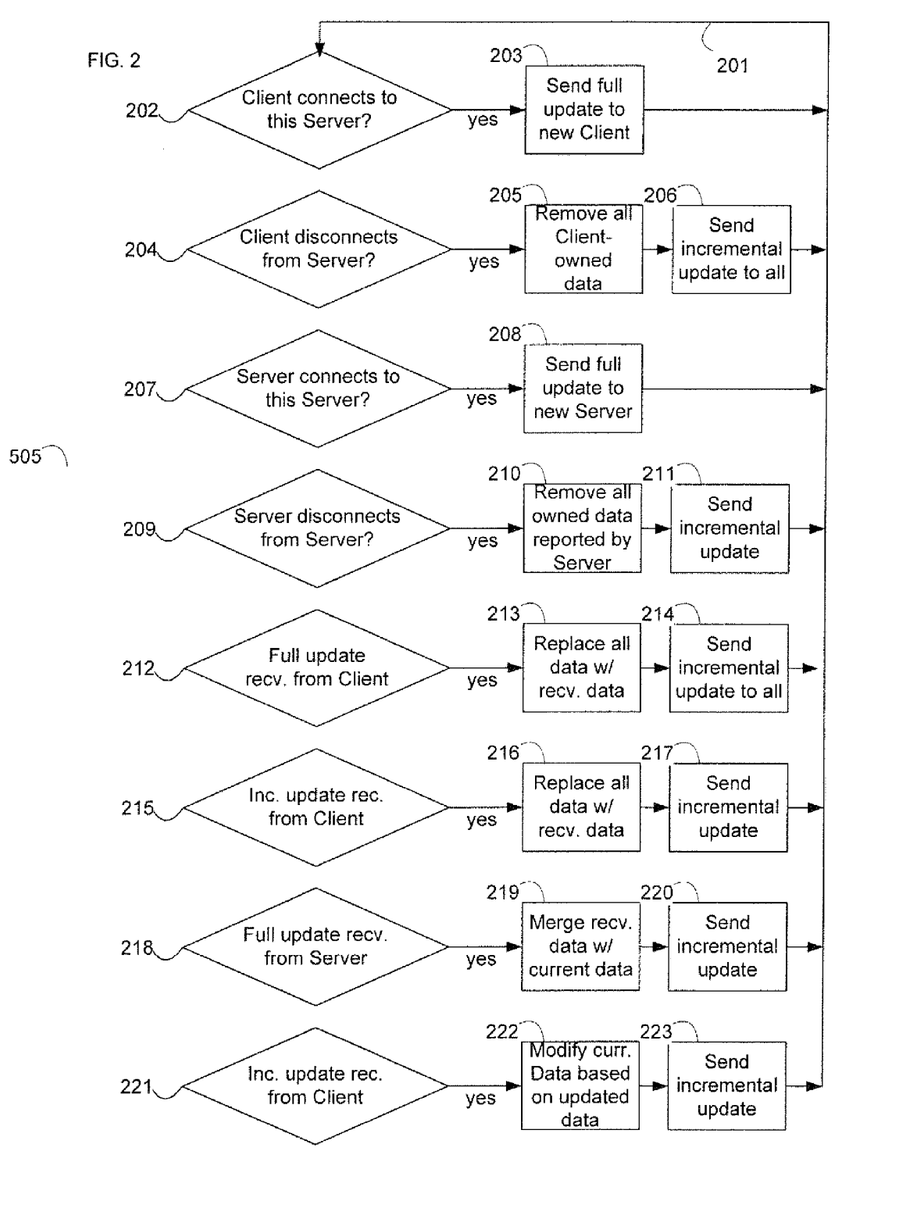
FIG. 2 shows a flow diagram for server operation in accordance with an embodiment of the present disclosure.

As shown in FIG. 2, in the environment presented above, a server can perform the actions outlined below in case of the events also listed. A server can, for example, execute a loop (201) in which certain events are checked, and appropriate actions are taken, which can be as follows:

If a client connected to this server (202): Send a full update to the client that connected. This update can contain all shared data elements (203).

If a client disconnected from this server (204): Remove all data elements owned by the client that disconnected (205). Send an incremental update to all connected clients and servers (206). This update can indicate the removal of this data.

If another server connected to this server (or this server connected to another server) (207): Send a full update to the other server (208). This update can contain all data elements except that which was reported by servers in the same node as the other server (including the other server itself).

If another server disconnected from this server (209): Remove all owned data elements which were reported by the server (210). Send an incremental update to all connected clients and servers except servers in the same node as the server which disconnected (which would therefore also be the same node as this server) (211). This update can indicate the removal of the data.

If a full update is received from a client (212): Replace all current data elements specified by the client with the new data (213). Send an incremental update to all connected clients and servers (214). This update indicates the changes to the data.

If an incremental update is received from a client (215): Replace all data elements specified by the client (216) with new data. Send an incremental update to all connected clients and servers (217). This update can indicate the changes to the data elements.

If a full update is received from a server (218): Merge all data specified by the server with the current data (219). Send an incremental update to all connected clients and servers except servers in the same node as the server which sent the update (which would therefore also be same the node as this server) (220). This update can indicate all changes to the current data.

If an incremental update is received from a server (221): Modify the current data according to the incremental update (222). Send an incremental update to all connected clients and servers except servers in the same node as the server which sent the update (which would therefore also be same the node as this server) (223). This update can be identical to the incremental update received.

Figure 3:
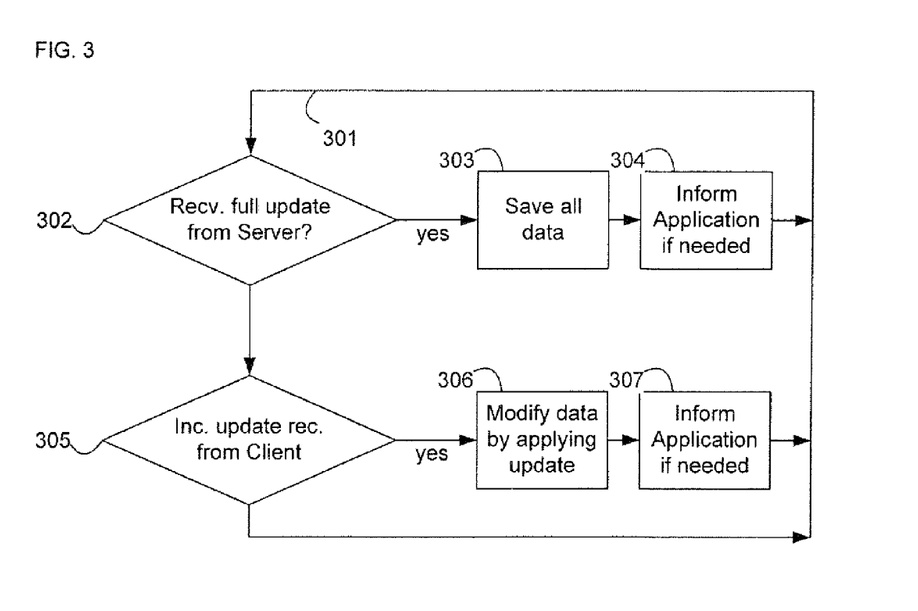
FIG. 3 shows a flow diagram for client operation in accordance with an embodiment of the present disclosure.

Referring to FIG. 3, a client can perform the indicated actions when one of the following events occurs. A client can, for example, execute a loop (301) in which certain events are checked, and appropriate actions are taken, which can be as follows:

If a full update is received from a server (302): Clear all existing data and save all the data in the full update (303). If the application, for example the user interface or device management mechanisms need to be notified of the new data, do so (304).

If an incremental update is received from a server (305): Modify the current data according to the incremental update (306). If the application needs to be notified of the changes to the data, do so (307).

According to the disclosed subject matter, the aforementioned protocol mechanisms can rely on many formats of data elements that can be transmitted between servers and clients. The protocol mechanisms can be generic in that they do may change their behavior based on the content of the data elements.

Figure 4:
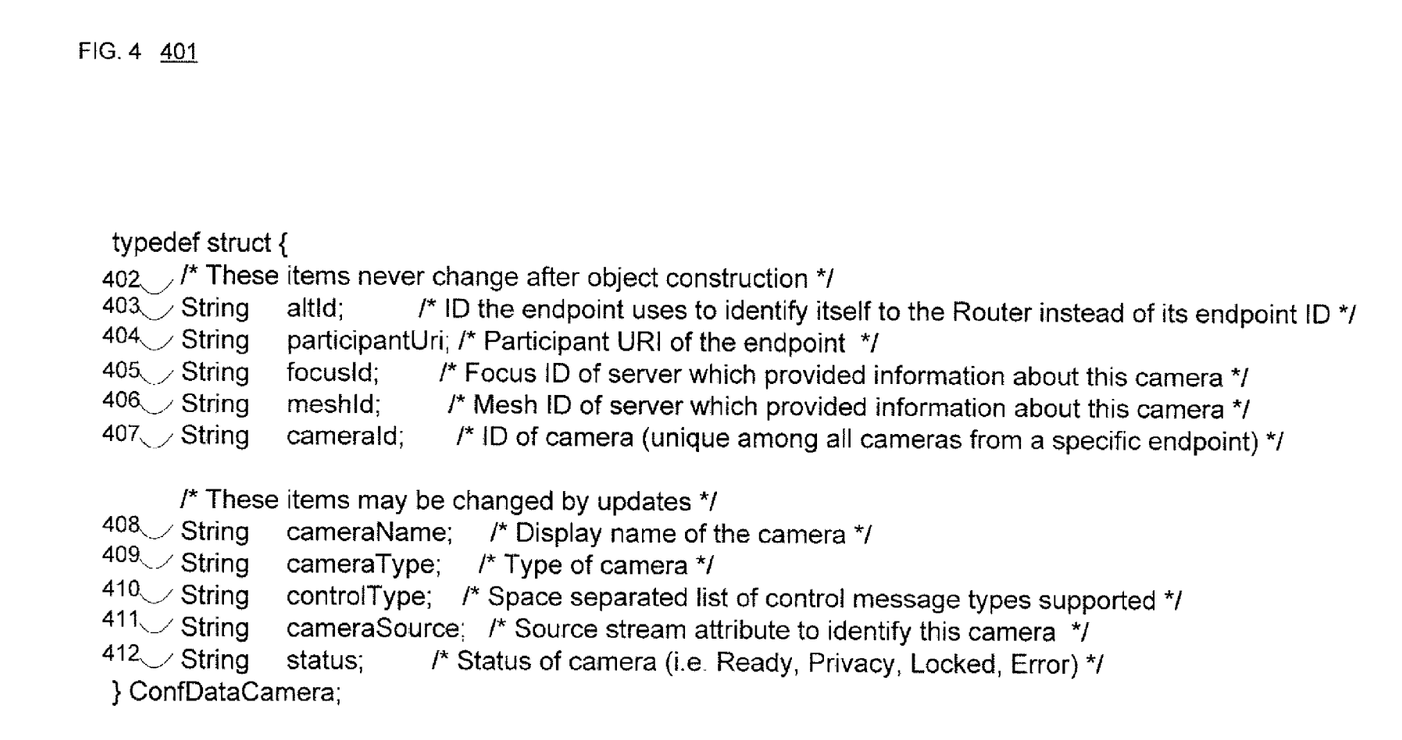
FIG. 4 shows a data structure for a camera data element in accordance with an embodiment of the present disclosure.

In the same or another embodiment, described next in FIG. 4 is as one example of a data element a camera control element associated with a client that can be used in a video conferencing system. A camera control element (401) can contain static data structures that do not change (402) during the lifetime of the data element, such as the ID of the client (altId, 403), the Unified Resource Identifier (URI) of the participant (participantURI, 404), and other static structures (focusId 405, meshId 406, cameraId 407). The camera control element can further comprise other data structures that may be updated using the aforementioned protocol mechanisms, such as name and type of the camera (cameraName 408, cameraType 409), the control mechanisms supported by the camera (controlType 410), cameraSource (411), and camera status (such as ready, privacy, locked, error, 412).

Other data element types can include, for example, available recording and playback devices for the conference, current moderator and speaker information, in-conference chat history, and any other information relevant to a particular conference The methods for communications described above, can be implemented as computer software using computer-readable instructions and physically stored in computer-readable medium. The computer software can be encoded using any suitable computer languages. The software instructions can be executed on various types of computers. For example, FIG. 5 illustrates a computer system 500 suitable for implementing embodiments of the present disclosure.

Figure 5:
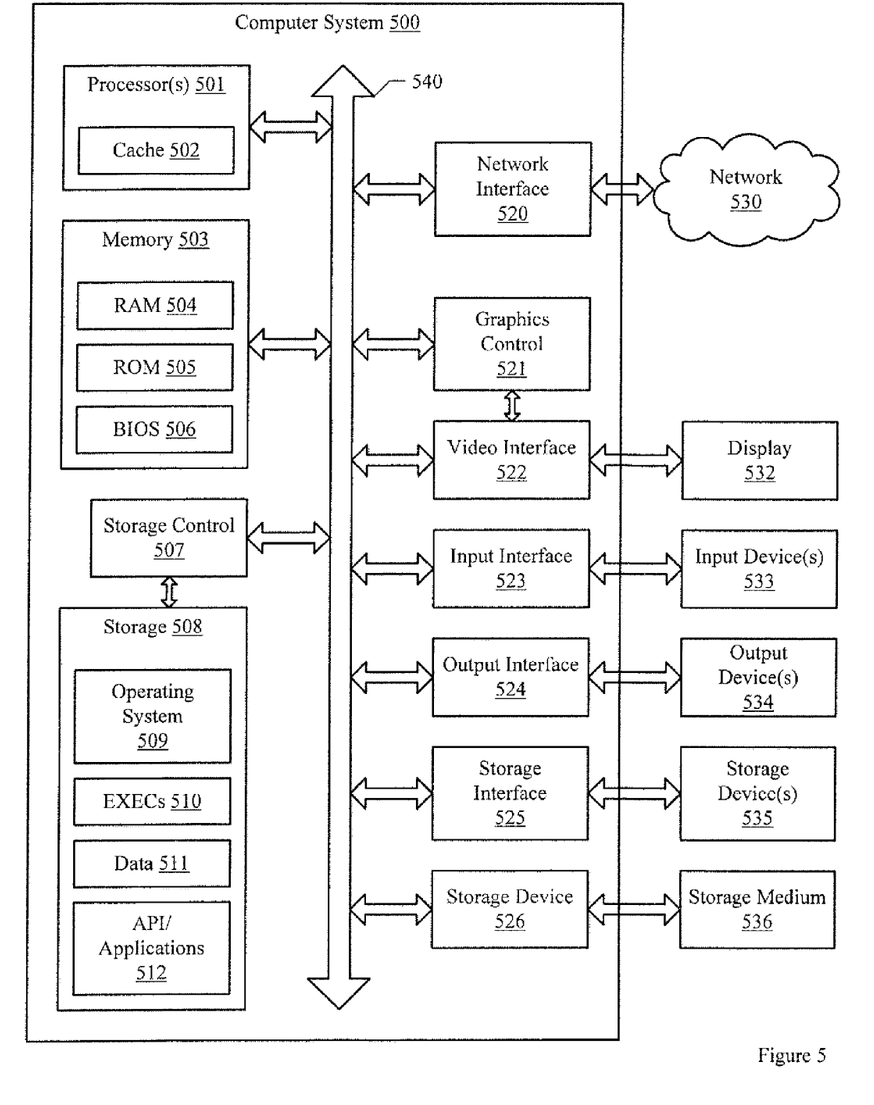
FIG. 5 shows an exemplary computer system in accordance with an embodiment of the present disclosure.

The components shown in FIG. 5 for computer system 500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 500 can have many physical forms including an integrated circuit, a printed circuit board, a small handheld device (such as a mobile telephone or PDA), a personal computer or a super computer.

Computer system 500 includes a display 532, one or more input devices 533 (e.g., keypad, keyboard, mouse, stylus, etc.), one or more output devices 534 (e.g., speaker), one or more storage devices 535, various types of storage medium 536.

The system bus 540 link a wide variety of subsystems. As understood by those skilled in the art, a "bus" refers to a plurality of digital signal lines serving a common function. The system bus 540 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 501 (also referred to as central processing units, or CPUs) optionally contain a cache memory unit 502 far temporary local storage of instructions, data, or computer addresses. Processor(s) 501 are coupled to storage devices including memory 503. Memory 503 includes random access memory (RAM) 504 and read-only memory (ROM) 505. As is well known in the art, ROM 505 acts to transfer data and instructions uni-directionally to the processor(s) 501, and RAM 504 is used typically to transfer data and instructions in a bi-directional manner. Both of these types of memories can include any suitable of the computer-readable media described below.

A fixed storage 508 is also coupled bi-directionally to the processor(s) 501, optionally via a storage control unit 507. It provides additional data storage capacity and can also include any of the computer-readable media described below. Storage 508 can be used to store operating system 509, EXECs 510, application programs 512, data 511 and the like and is typically a secondary storage medium (such as a hard disk) that is slower than primary storage. It should be appreciated that the information retained within storage 508, can, in appropriate cases, be incorporated in standard fashion as virtual memory in memory 503.

Processor(s) 501 is also coupled to a variety of interfaces such as graphics control 521, video interface 522, input interface 523, output interface 524, storage interface 525, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 501 can be coupled to another computer or telecommunications network 530 using network interface 520. With such a network interface 520, it is contemplated that the CPU 501 might receive information from the network 530, or might output information to the network in the course of performing the above-described method. Furthermore, method embodiments of the present disclosure can execute solely upon CPU 501 or can execute over a network 530 such as the Internet in conjunction with a remote CPU 501 that shares a portion of the processing.

According to various embodiments, when in a network environment, i.e., when computer system 500 is connected to network 530, computer system 500 can communicate with other devices that are also connected to network 530. Communications can be sent to and from computer system 500 via network interface 520. For example, incoming communications, such as a request or a response from another device, in the form of one or more packets, can be received from network 530 at network interface 520 and stored in selected sections in memory 503 for processing. Outgoing communications, such as a request or a response to another device, again in the form of one or more packets, can also be stored in selected sections in memory 503 and sent out to network 530 at network interface 520. Processor(s) 501 can access these communication packets stored in memory 503 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 500 can provide functionality as a result of processor(s) 501 executing software embodied in one or more tangible, computer-readable media, such as memory 503. The software implementing various embodiments of the present disclosure can be stored in memory 503 and executed by processor(s) 501. A computer-readable medium can include one or more memory devices, according to particular needs. Memory 503 can read the software from one or more other computer-readable media, such as mass storage device(s) 535 or from one or more other sources via communication interface. The software can cause processor(s) 501 to execute particular processes or particular parts of particular processes described herein, including defining data structures stored in memory 503 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

I claim:

1. A method for updating at least one conference state data element in a conference, the conference comprising a first node comprising at least a first server but no endpoints; a second node coupled to the first node, the second node comprising at least a second server but no endpoints; a first endpoint coupled to the first server; a second endpoint coupled to the second server; the at least one conference state data element owned by the first endpoint being present in at least each of the first server, the second server, the first endpoint and the second endpoint; wherein the conference does not include a dedicated server acting as a controller, the method comprising:
the first endpoint leaving the conference by decoupling from the first server;
the first server sending an update indicating the first endpoint leaving the conference to the second server;
the second server sending an update indicating the first endpoint leaving the conference to the second endpoint;
wherein the updates do not include the at least one conference state data element owned by the first endpoint; and
all of the first server, the second server, and the second et removing the at least one conference state data element owned by the first endpoint from the conference state of the first server, the second server, and the second endpoint, respectively.

2. The method of claim 1, wherein the first and second nodes and first and second endpoints are coupled together in a free tree topology.

3. The method of claim 1, wherein at least one of the initial update or the update is sent over a signaling plane.

4. The method of claim 1, wherein the at least one conference state data element includes a camera control data element.

5. The method of claim 4, wherein the camera control data element comprises a static data structure that does not change while the first endpoint is coupled to the first server.

6. The method of claim 5, wherein the static data structure comprises an identifier of the first endpoint.

7. The method of claim 6, wherein the static data structure further comprises an Unified Resource Identifier of a participant.

8. The method of claim 7, wherein the static data structure further comprises at least one of a focusID and a cameraID.

9. The method of claim 4, wherein the camera control data element comprises a data structure that can be updated while the first endpoint is coupled to the first server.

10. A non-transitory computer readable medium comprising a set of instructions to direct a processor to perform the method of claim 1.

11. The method of claim 1, further comprising, upon newly connecting of a third endpoint by coupling the third endpoint to the first server, at least one conference state data element owned by the third endpoint is sent as an incremental update from the first server to the second server, and from the second server to the second endpoint, and is added by the first server, second server, and second endpoint to their conference state.

12. A system for updating at least one conference state data element in a conference, the system comprising:
a first node comprising at least a first server but no endpoints;
a second node coupled to the first node, the second node comprising at least a second server but no endpoints;
a first endpoint coupled to the first server; and
a second endpoint coupled to the second server;
wherein the system does not comprise a dedicated server acting as a controller;
wherein the first and second nodes form a free tree topology;

wherein the at least one conference state data element is owned by the first endpoint and present in at least each of the first server, the second server, the first endpoint and the second endpoint;

wherein the first endpoint is configured to leave the conference by decoupling from the first server, the first server is configured to send an update indicating the first endpoint leaving the conference to the second server, and the second server is configured to send an update indicating the first endpoint leaving the conference to the second endpoint;

wherein the updates do not include the at least one conference state data element owned by the first endpoint; and wherein all of the first server, the second server, and the second endpoint are configured to remove the at least one conference state data element owned by the first endpoint from the conference state of the first server, the second server, and the second endpoint, respectively.

* * * * *